United States Patent [19]

Sautter

[11] 4,061,279
[45] Dec. 6, 1977

[54] HIGH-SPEED ROTATING CRUSHING MACHINERY

[75] Inventor: Daniel C. Sautter, Kimberton, Pa.

[73] Assignee: Pennsylvania Crusher Corporation, Broomall, Pa.

[21] Appl. No.: 765,720

[22] Filed: Feb. 4, 1977

Related U.S. Application Data

[63] Continuation of Ser. No. 662,631, March 1, 1976, abandoned, Continuation-in-part of Ser. No. 501,551, Aug. 29, 1974, abandoned.

[51] Int. Cl.² .................................... B02C 23/00
[52] U.S. Cl. .................... 241/86.1; 64/1 V; 68/23.3; 74/574; 241/275
[58] Field of Search .................. 241/5, 86.1, 275; 64/1 V; 68/23.1, 23.3; 74/5.5, 574; 308/9, 122; 51/169

[56] References Cited

U.S. PATENT DOCUMENTS

| 2,220,524 | 11/1940 | Kapitza | 74/574 |
|---|---|---|---|
| 2,474,314 | 6/1949 | Koehne | 241/4 |
| 2,652,700 | 9/1953 | Seibel | 64/1 V |
| 3,040,598 | 6/1962 | Warren | 74/574 |
| 3,116,813 | 1/1964 | Ziegler | 68/23.3 |
| 3,135,689 | 6/1964 | Antinori | 68/23.3 |
| 3,162,382 | 12/1964 | Danyluke | 241/275 |
| 3,456,992 | 7/1969 | Kulina | 308/9 |
| 3,499,691 | 3/1970 | Baier | 308/9 |
| 3,549,216 | 12/1970 | Sutyak | 308/122 |
| 3,606,182 | 9/1971 | Warren | 241/275 |
| 3,738,717 | 6/1973 | Gardner | 308/122 |

FOREIGN PATENT DOCUMENTS 1,049,787  7/1959  Germany ........................... 241/275

Primary Examiner—Granville Y. Custer, Jr.
Attorney, Agent, or Firm—Pollock, Vande Sande & Priddy

[57] ABSTRACT

Improved drive shafting elements suitable for use in high speed rotating crushing machinery are disclosed comprising a central cantilever shaft mounted within a surrounding sleeve to which the cantilever shaft is rigidly connected at one end and within which the cantilever shaft has substantial radial play at the other end to permit a rotating impeller or similar element mounted thereon to center itself automatically for rotation on its center of gravity at speeds above the first critical speed. Means are included for damping radial vibrations as the shafting rotates through the first critical speed and for damping whirl due to shaft instabilities and self-excited vibrations above the first critical speed. Improved impactor targets for use in centrifugal crushing machines and and improved centrifugal crushing method are also disclosed.

63 Claims, 16 Drawing Figures

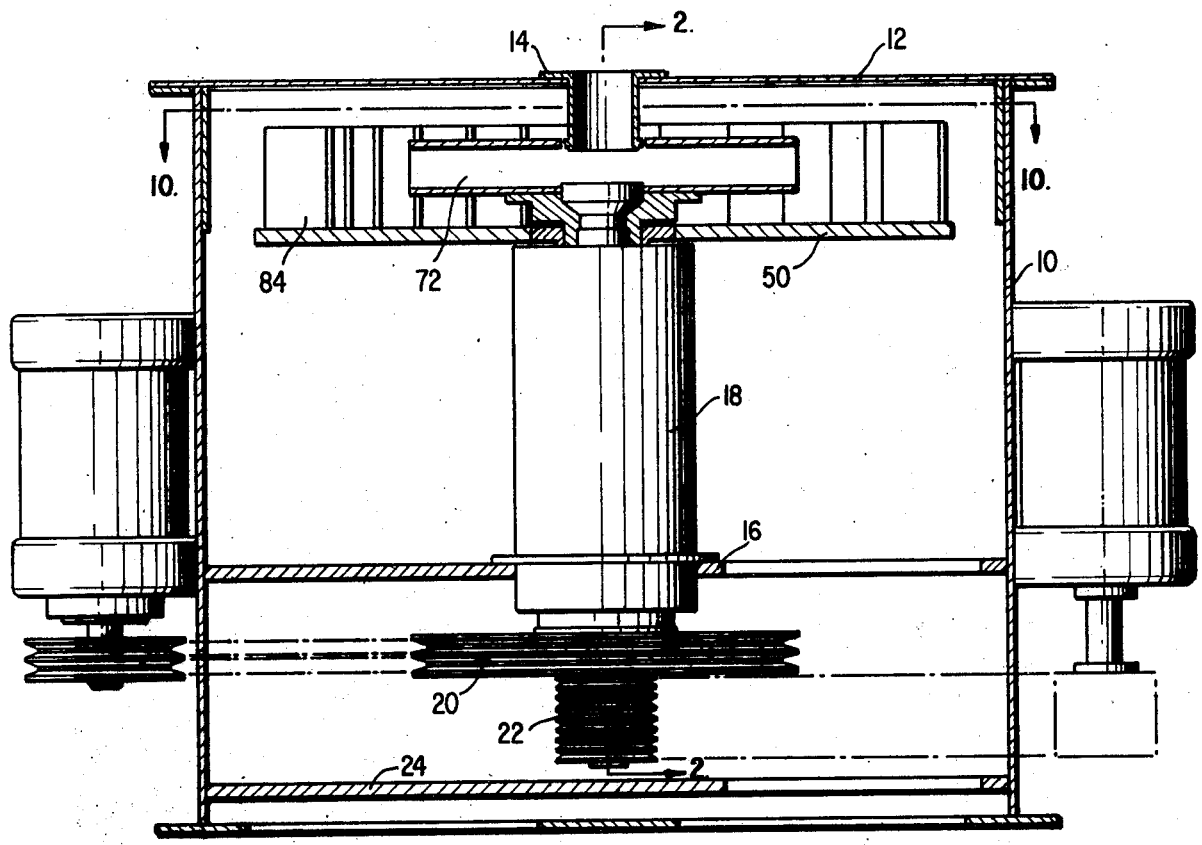
FIG. 1
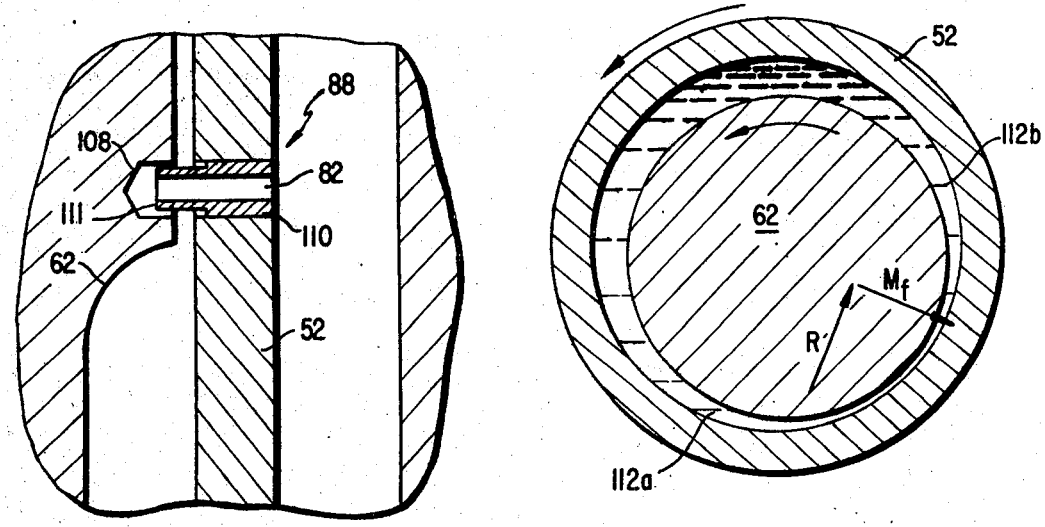
FIG. 6
FIG. 7

HIGH-SPEED ROTATING CRUSHING MACHINERY

CROSS-REFERENCE TO RELATED APPLICATION

This application is a continuation of my copending application Ser. No. 662,631, filed Mar. 1, 1976, now abandoned, which is a continuation-in-part of my prior copending application Ser. No. 501,551, filed Aug. 29, 1974 for IMPROVEMENTS IN HIGH-SPEED ROTATING CRUSHING MACHINERY AND CRUSHING METHODS, now abandoned.

BACKGROUND OF THE INVENTION

This invention relates generally to the field of high speed rotating machinery and more particularly to crushing machines of the type in which a stream of material such as ore, limestone, coal, rock or the like is fed to an impeller wheel or disk which accelerates the material to a high velocity and hurls it centrifugally against an adjacent target or impact surface where the material is broken up by the force of the impact.

A prior art crusher of this type is shown in U.S. Pat. Nos. 3,162,382 and 3,180,582 granted to Ostap Danyluke and assigned to the assignee of the present application. In the patented devices, the material particles leaving the impeller are caused to collect in an annular space outboard of the impeller, where they are subject to continued bombardment by additional particles thrown out by the impeller, producing additional crushing of the particles. While this type of autogenous crushing apparatus has some advantages such as minimization of wear on the impaction surfaces due to the protection afforded by the collected layer of material particles, centrifugal crushing systems similar to those disclosed by Danyluke have been subject to some vexing problems.

Factors such as shaft instabilities and self-induced vibrations at high speeds have resulted in excessive lateral vibrations and whirl in the impeller shafting. This vibration is aggravated by imbalanced conditions in the impeller wheels of prior art devices due, for example, to uneven impeller wear in operation, a clogged flow passage, manufacturing variations, or the presence of a single heavy particle in the impeller. Such lateral vibration is transmitted to the shaft bearings of both the impeller and the moving impact surfaces, with resultant high incidence of bearing wear and failure.

The lateral vibration of the drive shafting in such prior art crushing machines is thought to be a combination of two different types of vibration or movement: one, a forced or resonant type; and the other, a self-excited or instability type. In the resonant type, the most common driving frequency is the shaft speed or some multiple thereof. Some stimuli which have been noted for resonant vibrations are: rotor unbalance, in which the vibration is excited by the centrifugal force acting on the rotor's eccentric center of gravity; shaft misalignment, in which the rotor centerline is not true to the centerline of the bearings at either end of the shaft; and periodic loading applied to the rotor by external forces such as those mentioned previously.

Self-excited vibrations or instabilities are characterized by the presence of some sort of a mechanism which causes the shaft to whirl at or near its own natural frequency, usually independent of the frequency of shaft rotation and other external stimuli. Such self-excited vibrations are rather subtle and difficult to diagnose, buth are potentially quite destructive since whirling due to self-induced vibration induces alternating stresses in the shaft and rotor which can lead to fatigue failures.

These instabilities or self-excited vibrations, generally referred to as whirling or whipping, are characterized by the generation of a tangential force normal to the radial deflection of the rotating shaft. The magnitude of the force is proportional to, or varies monotonically with, the radial deflection of the rotating shaft. For a more complete discussion of such behavior, see "Identification and Avoidance of Instabilities and Self-Excited Vibrations in Rotating Machinery" by F. F. Ehrich, ASME publication No. 72-DE-21, Design Engineering Division, 1972 (10 pages).

In crushing machines of the type now under discussion, the self-excited tangential forces may be large enough to overcome the external damping forces of the device at some onset speed and thus induce a whirling motion of ever increasing amplitude, subject only to nonlinearities which ultimately limit deflections. Various instabilities such as hysteretic whirl, dry friction whip and fluid bearing whip are thought to contribute to this whirling phenomenon. The following discussion is not a complete catalogue of the mechanisms which contribute to whirl due to instability and self-excited vibration, but is presented only to illustrate the types of problems overcome or controlled by this invention.

In hysteretic whirl, a nominal shaft deflection induces a neutral strain axis normal to the deflection axis. Assuming the neutral stress axis is coincident with the neutral strain axis, the net elastic restoring force should be parallel to and opposing the deflection. However, hysteresis or internal friction in the shaft causes a phase shift in the development of stress as the shaft fibers rotate around through peak strain to the neutral strain axis. The result is that the neutral stress axis is displaced from the neutral strain axis so that the net elastic restoring force is not parallel to and opposing the deflection. The restoring force thus has a tangential component normal to the deflection which may be large enough to induce a whirling motion in the direction of shaft rotation. The whirling motion increases the centrifugal force on the deflected rotor, thereby increasing its deflection, thereby increasing the magnitude of the tangential component and so forth. Hysteretic whirl usually occurs only at speeds above the first critical speed of the shaft.

In dry friction whip, the surface of the rotating shaft comes in contact with an unlubricated stationary, or relatively slow moving, guide or shroud. When radial contact is made, friction will induce a tangential force on the rotor. Since the friction force is approximately proportional to the radial component of the contact force, instability can occur, as previously described for hysteretic whirl. In this instance, however, the whirl will be opposite to the direction of shaft rotation.

In fluid bearing whip, the shaft rotates in a gas or liquid filled clearance. The entrained, viscous fluid will circulate with an average velocity of about half the surface speed of the shaft. For a nominal radial deflection of the shaft, the bearing pressures will not be symmetric about the radial deflection line. Because of viscous losses of the bearing fluid passing through the close clearance, the pressure on the upstream side of the close clearance will be higher than on the downstream side. A tangential force results which tends to whirl the shaft in the direction of shaft rotation. When this tangential force is greater than the internal damping of the system, a whirl is induced, as previously described.

Other factors known to contribute to self-excited instabilities and their resultant whirl are asymmetric shafting and pulsating torque application which may cause parametric excitation. In the case of asymmetric shafting, sufficient levels of asymmetry in the flexibility associated with the two principle axes of flexure of the shaft or rotor will cause periodic changes in shaft flexibility as the shaft rotates. This will cause instability at some speeds. The application of pulsating torque to a shaft affects its natural frequency in lateral vibration, which can cause instabilities in some speed ranges.

In addition to the above types of problems, the autogenous grinding machines of the prior art frequently require the use of higher power inputs or large numbers of repeated crushing cycles to produce desired size reductions, possibly due to dynamic inefficiencies of the impacts experienced between material leaving the impeller and the material collected on the impactor surfaces. Moreover, autogenous grinding tends to produce a large proportion of fines in the crushed product, which may be wasted in many applications where larger particles are desired.

OBJECTS OF THE INVENTION

An object of the invention is to provide a drive shafting apparatus for use in machines having a high speed rotating impeller and in similar applications such as centrifuges, liquid and solid separators and the like, including means for permitting the impeller or other high speed rotating element to rotate about its own center of gravity, whereby vibrations are reduced.

Another object of the invention is to provide a drive shafting apparatus for use in machines having a high speed rotating impeller or the like, including means for minimizing radial vibration of the shafting as the impeller is accelerated past critical frequencies and for damping whirl due to instability and self-excited vibration above the first critical frequency.

A further object of the invention is to provide a crushing machine including impactor targets or vanes arranged to be struck by material leaving a high speed rotating impeller, the vanes being so oriented relative to the path of particles projected from the impeller as to produce optimum crushing due to a single impact and to generate air flow past said vanes to sweep the vanes clean of crushed material.

Another object of the invention is to provide a crushing machine and method of crushing in which material to be crushed is accelerated to a high velocity and projected toward a surrounding plurality of targets so spaced from the impeller of the machine that a large proportion of the fine particles in said material are slowed by air resistance before striking said targets, whereby said fines are not further crushed, thereby minimizing the percentage of fines in the crushed product.

Still another object of this invention is to provide a crushing machine which produces a crushed product of substantially uniform particle size within a chosen size range, having small percentages of oversize particles and fines in the crushed product.

The above objects of the invention are only exemplary of the problems which applicant has sought to solve, thus other objects achieved by the invention may occur to those skilled in the art. Nonetheless, the invention possesses unique and advantageous features as are more explicitly set forth hereinafter and recited in the appended claims.

SUMMARY OF THE INVENTION

The above and other desirable objects are achieved by the invention, which comprise in one of its embodiments a machine including a high speed rotating impeller or the like and having an outer sleeve shaft mounted for rotation within said machine; an inner cantilever shaft rigidly connected at one end of said cantilever shaft within said outer sleeve shaft and having substantial radial play within said sleeve shaft at the other end of said cantilever shaft, said other end being rigidly connected to said impeller; and damper means situated about said other end of said cantilever shaft for reducing radial vibration of said cantilever shaft as it rotates through critical speeds and for damping whirl due to instability and self-excited vibration above the first critical frequency. In another embodiment of the invention, a second sleeve shaft is located concentrically and coaxially with the first to drive a rotating impactor bowl or ring or other structure surrounding said impeller.

The improved impactor bowls or rings and method of crushing according to the invention may also be used to produce a more uniform crushed product. To these ends a plurality of circumferentially spaced impact targets are arranged about the impeller and spaced radially therefrom, the targets presenting impact surfaces to particles projected from the impeller which are oriented at approximately right angles to the path of said particles. Where the targets are moving relative to said impeller, the orientation of the targets causes air flow to be generated thereover, which tends to sweep the targets clean of crushed materials.

The damper means according to the invention comprise at least one ring resiliently mounted about the other end of the cantilever shaft, the ring being resiliently biased to allow limited radial deflection of the cantilever shaft during rotation. In one embodiment, the inner bore of the ring includes means for inducing loss of contact between the cantilever shaft and the inner bore. In another embodiment, the ring includes resilient means for absorbing energy from the shaft as the shaft deflects radially. Each embodiment of the ring tends to substantially eliminate whirl due to rotational instabilities and self-excited vibrations above the first critical frequency. A hydraulic damper is also provided.

BRIEF DESCRIPTION OF THE DRAWINGS

FIG. 1 shows an elevation view, in section, of one embodiment of the invention in which single pass crushing is achieved.

FIG. 6 shows an enlarged view of the unique features of the hydraulic vibration damper features of the invention.

FIG. 7 shows an enlarged plan view, in section, taken along line 7—7 of FIG. 4, indicating the principles of operation of the hydraulic damper when the impeller shaft has deflected.

DESCRIPTION OF THE PREFERRED EMBODIMENTS

Figure 2:
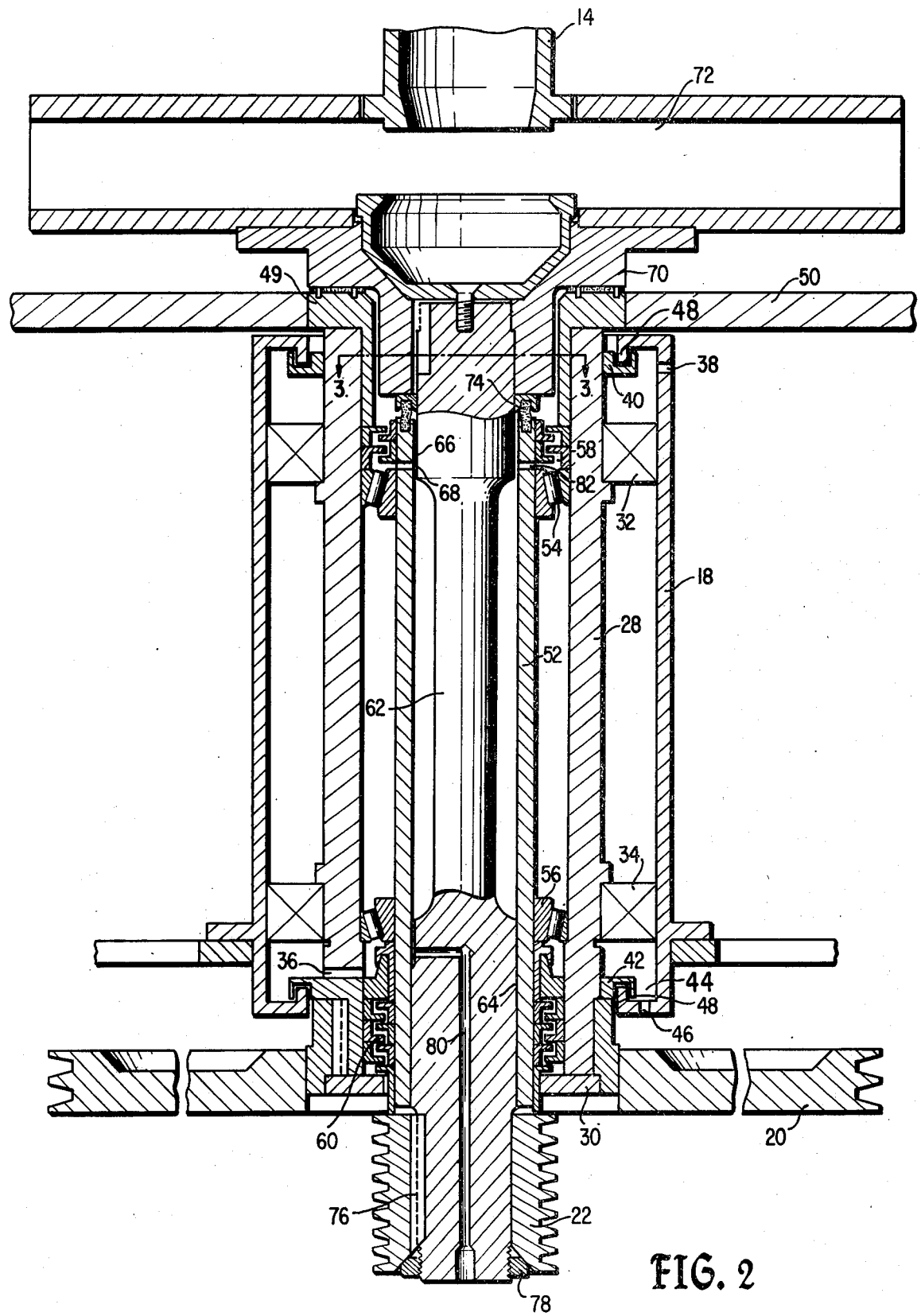
FIG. 2 shows an elevation view, in section, of one embodiment of a drive shafting arrangement suitable for the machine of FIG. 1 and similar applications.

There follows a detailed description of the preferred embodiments of the invention, reference being made to the drawings in which like reference numerals identify like elements of structure in each of the several figures. Although certain embodiments of the invention are disclosed with reference to crushing machine applications, one skilled in the art will realize that the unique drive shafting and vibration and whirl damping mechanisms will find application in many types of apparatus where related vibration problems may occur, as previously suggested.

FIG. 1 shows an elevation view partially in section of one embodiment of the invention in which single pass crushing is achieved. An essentially cylindrical housing or frame 10 includes an upper access cover 12 having a centrally located inlet hopper 14 through which material to be crushed is introduced into the machine. Within cylindrical frame or housing 10 is located a support spider 16 upon which is mounted a centrifugal shaft housing 18, as indicated. The interior details of the drive shafting enclosed by housing 18 are shown in FIGS. 2, 4, 4A and 8. Extending below support spider 16 are impactor and impeller drive sheaves 20 and 22 which are housed within a protective channel (not shown) defined by support spider 16 and lower wall 24. Drive belts for sheaves 20 and 22 extend through the protective channel to provide motive power for the crushing machine.

As shown in detail in FIG. 2, impactor sheave 20 is rigidly affixed to outer sleeve shaft 28 by retainer ring 30. Outer sleeve shaft 28 is, in turn, mounted for rotation within centrifugal shaft housing 18 via upper and lower bearings 32 and 34, as shown. Outer sleeve shaft 28 is pierced at its lower end by a plurality of radial passages 36 which allow flow of lubricant from the interior of outer sleeve shaft 28, as will be subsequently discussed. Cylindrical shaft housing 18 is pierced at its upper end by a plurality of radial passages 38 through which lubricant may be introduced under pressure for cooling and lubricating bearings 32 and 34. Affixed to outer sleeve shaft 28 at locations just below lubrication passage 36 and above lubrication passage 38 are lubricant flinger rings 44 and 42 which facilitate passage of oil through the annulus between outer sleeve shaft 28 and cylindrical shaft housing 18 downwardly toward annular oil collection volume 40 and outward through passage 46 to the oil sump (not shown). Seals 48 prevent duct and other contaminants from reaching the annulus between cylindrical shaft housing 18 and outer sleeve shaft 28. The upper end of outer sleeve shaft 28 is rigidly affixed via suitable means such as bearing and seal retainer 49 to impactor support disk 50 whereby disk 50 may be rotated when rotative force is applied to sheave 20.

Mounted for rotation within outer sleeve shaft 28 is inner sleeve shaft 52, via bearings 54 and 56. Conventional labyrinth lubricant seals 58 and 60 are used to minimize oil leakage from the annulus between outer sleeve shaft 28 and inner sleeve shaft 52. Mounted within inner sleeve shaft 52 is cantilever or quill shaft 62 which is shrink fitted at its lower end 64 to the inside diameter of inner sleeve shaft 52 to provide a rigid connection between cantilever shaft 62 and inner sleeve shaft 52 at that location. At the upper end 66 of cantilever shaft 62 there is provided a substantial radial clearance 68 between cantilever shaft 62 and inner sleeve shaft 52. This radial clearance is chosen to be the maximum permissible deflection without causing permanent bending of shaft 62, but is small enough to facilitate the hydraulic whirl damper to be discussed with respect to FIGS. 6 and 7. Thus, upper end 66 of cantilever shaft 62 is permitted substantial radial movement relative to the upper end of inner sleeve shaft 52. Rigidly attached to upper end 66 of cantilever shaft 62 is the hub 70 of impeller wheel or disk 72 of the crushing machine. As referred to in this application, hub 70 and the upper end of cantilever shaft 62 are considered to behave as an integral unit; thus, contact with hub 70 is considered to be contact with shaft 62. A flexible seal 74 joins the uppermost end of inner sleeve shaft 52 to hub 70 to prevent oil leakage from the annulus between cantilever shaft 62 and inner sleeve shaft 52.

Sheave 22 is attached to the lower end of cantilever or quill shaft 62 by means of a key 76 and retainer 78, as indicated. Extending upwardly through the lower end 64 of cantilever shaft 62 is oil channel 80 which provides lubricant flow to the annulus between cantilever shaft 62 and inner sleeve shaft 52. At the upper end of inner sleeve shaft 52, just above bearing 54, are located a plurality of radial lubricant passages 82 which provide a flow path for lubricant into the annulus between outer sleeve shaft 28 and inner sleeve shaft 52. Thus lubricant flows upwardly through oil channel 80 and, due to the rotating movement of inner sleeve shaft 52, spirals upwardly along the inside diameter of inner sleeve shaft 52, out through radial oil passages 82, downwardly through bearings 54 and 56 and outwardly through radial oil passages 36 to exhaust through passages 46 to the oil sump, as previously described. Since lubricating oil flows on both the interior and exterior surfaces of shafts 28 and 52, a substantial cooling of both shafts is achieved by the flow. This tends to minimize any differential thermal expansion of shafts 28 and 52, thereby minimizing changes of the axial clearances of bearings 54 and 56 which would induce stress and wear to the bearings.

The impeller 72 of the invention may be substantially identical to that shown in U.S. Patent Number 3,346,203 which receives feed of material to be crushed through a centrally located inlet hopper 14, accelerates the material radially and then projects it outwardly at a high rate of speed into contact with a surrounding impactor surface. Thus, it is the high speed of the particles, rather than the impactors which produces the crushing impact. In the embodiment of the invention shown in FIG. 1, the surrounding impactor surface consists of a plurality of upstanding impactor vanes 84 mounted near the periphery of impactor support disk 50, as indicated. The radial separation between impeller 72 and vanes 84 influences the amount of crushing achieved in that a longer separation will cause the finer, or lighter, particles to be slowed from their initial high velocity quite substantially by air resistance, to the point that virtually no further crushing of finer particles is achieved at vanes 84 due to the reduced velocity of the particles, whereby a product having a small proportion of fines is obtained. Conversely, reducing the separation of the impeller and vanes will produce a product having a relatively larger proportion of fines, since the air resistance over the shorter separation is less effective in reducing the velocity of the fines to the point where no further crushing is achieved. The particular orientation of the impactor vanes relative to the paths traveled by particles leaving impeller 72 and additional unique functions of impactor vanes 84 will be further discussed with regard to FIG. 10.

In operation, sheaves 20 and 22 are driven by appropriate motors attached to the exterior of frame or housing 10 until the impeller 72 and impactor support disk 50 have reached their preferred operating speeds. Normally impactor support disk 50 rotates at about 300 to 400 r.p.m.; whereas, impeller 72 rotates at from 2,400 to 6,000 r.p.m., or two to five times its initial critical frequency. Since impeller disk 72 is a relatively massive component which may weigh hundreds of pounds and is made from a series of weldments, it is not desirable economically to manufacture impeller 72 so as to be perfectly balanced about its geometruc center. Thus, the provision of cantilever shaft 62, which is rigidly affixed to hub 70 of impeller disk 72, provides sufficient flexibility in the rotating system comprised of shaft 62, hub 70 and impeller disk 72, to permit the impeller disk to rotate about its own center of gravity, which eliminates any need for precise balancing of the impeller disk 72. Such self-centering occurs at speeds above the first critical. The rotation of the impeller disk 72 about its own center of gravity causes the center of upper end of cantilever shaft 62 to undergo an eccentric movement relative to the center of the upper end of sleeve shaft 52. Most of the vibration resulting from this eccentric movement is absorbed at lower end 64 of flexible cantilever shaft 62. Thus, transmission of vibration from the high speed impeller shafting to the bearings supporting inner and outer sleeve shafts 52 and 28 is minimized, thereby prolonging bearing life.

While the embodiment of the invention shown in FIGS. 1 and 2 has the desirable characteristic of minimizing the transmission of vibration from the impeller 72 and its cantilever shaft 62 to the surrounding bearings supporting the drive shafting at speeds above the first critical frequency, it has been found that machines including the unique shafting just described may continue to exhibit undesirable vibration while passing through the first critical frequency. As is well known in the mechanical arts, when a rotating system passes through a critical frequency, the vibration amplitude factor becomes very high, which will result in much higher amplitudes of vibration at the critical frequency than at speeds above and below this frequency. In some systems, it is possible to pass through the critical frequency without excessive vibration amplitude by carefully balancing all of the rotating parts; however, as previously mentioned, in the crushing machines according to the present invention and in many similar applications such precise balancing is not considered practical due to the expense involved in precisely machining parts such as the impeller disk which might otherwise be made by less exacting procedures. Moreover, previously mentioned factors such as uneven impeller wear, clogged channels in the impeller, presence of a single, heavy particle in the impeller and the like could produce impeller imbalances no matter how carefully made the impeller itself might have been to begin with.

Figure 3A:
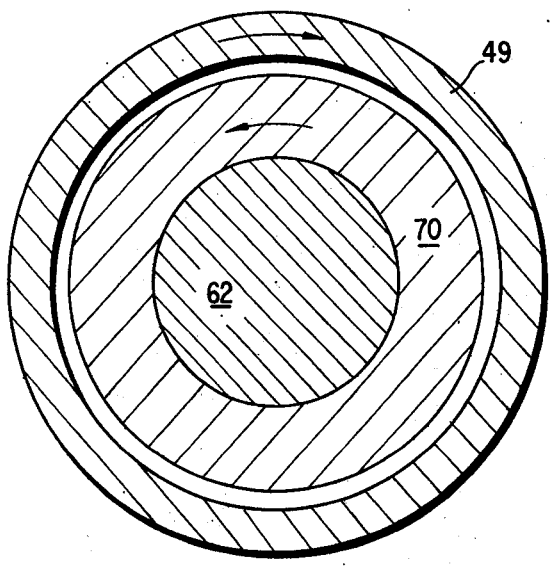
FIGS. 3A and 3B show partial section views taken along line 3—3 of FIG. 2, indicating schematically movement of the impeller shaft in operation.
Figure 3B:
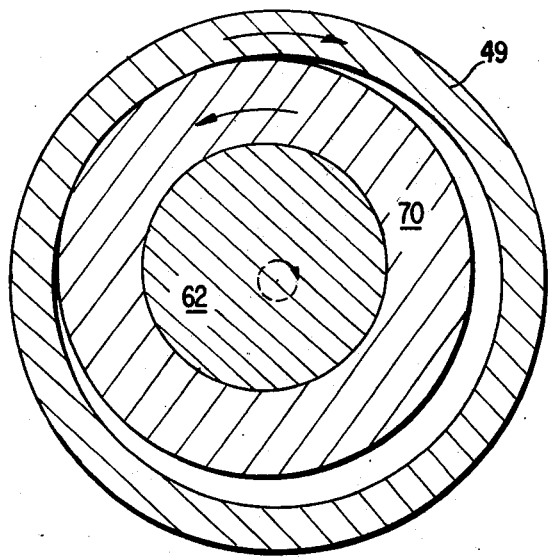

FIGS. 3A and 3B show schematically two possible positions of the cantilever shaft and impeller hub as they rotate within bearing and seal retainer 49. The clearances have been exaggerated for clarity. In FIG. 3A, the cantilever shaft 62 and impeller hub 70 are shown rotating essentially concentrically within the bore of surrounding bearing retainer 49. As previously mentioned, the center of cantilever shaft 62 will experience a slight eccentric motion due to the tendency of impeller disk 72 to rotate about its center of gravity on the flexible shaft 62. This motion may aggravate shafting instabilities and self-excited vibrations of the types previously discussed. Moreover, due to the relatively large mass of the impeller disk 72 and its high speed of rotation, the rotating shaft 62 and impeller disk 72 exhibit gyroscopic characteristics in operation, particularly at speeds above the critical frequency.

FIG. 3B illustrates schematically the movement of cantilever shaft 62 and impeller hub 70 from an essentially central location radially into contact with retainer 49 as the impeller is rotated through a critical frequency. No material is being fed to impeller 72 at this point. As the amplitude of vibration of the cantilever shaft 62, impeller hub 70 and impeller disk 72 increases at the critical frequency, there may come a time when contact will be established with the inside diameter of retainer 49. This contact creates a new dynamic system having a higher critical frequency. The rotation of the new shafting system which includes the imbalance caused by the deflected impeller and shaft results in the direct transmission of excessive vibration to the bearings supporting both the impeller and impactor shafts, with attendant undesirable bearing wear. Further, the contact between impeller hub 70 and the inside diameter of retainer 49 results in excessive wear at those locations.

Figure 4:
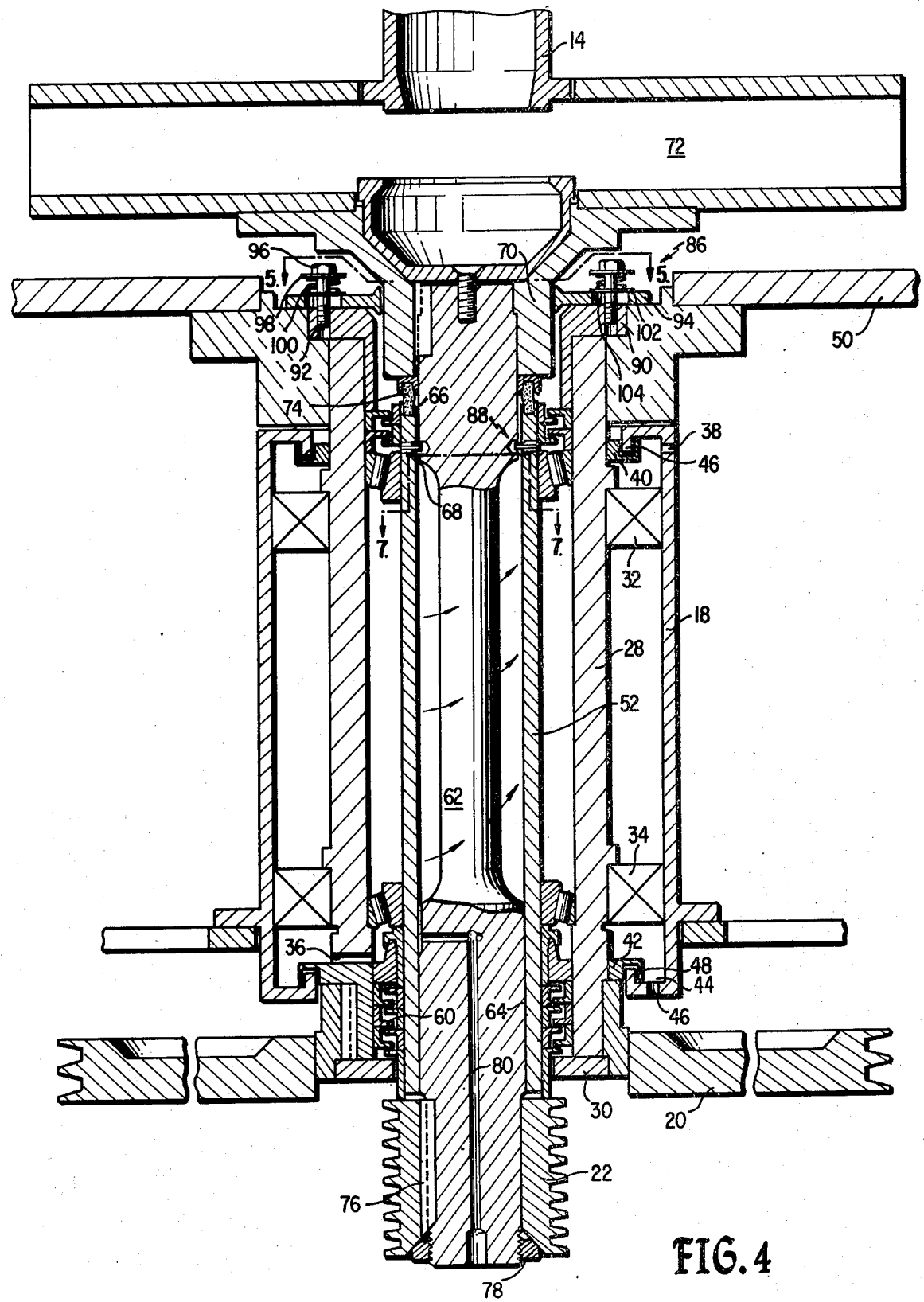
FIG. 4 shows an elevation view, in section, of another embodiment of the novel drive shafting and vibration damping features of the invention.
Figure 4A:
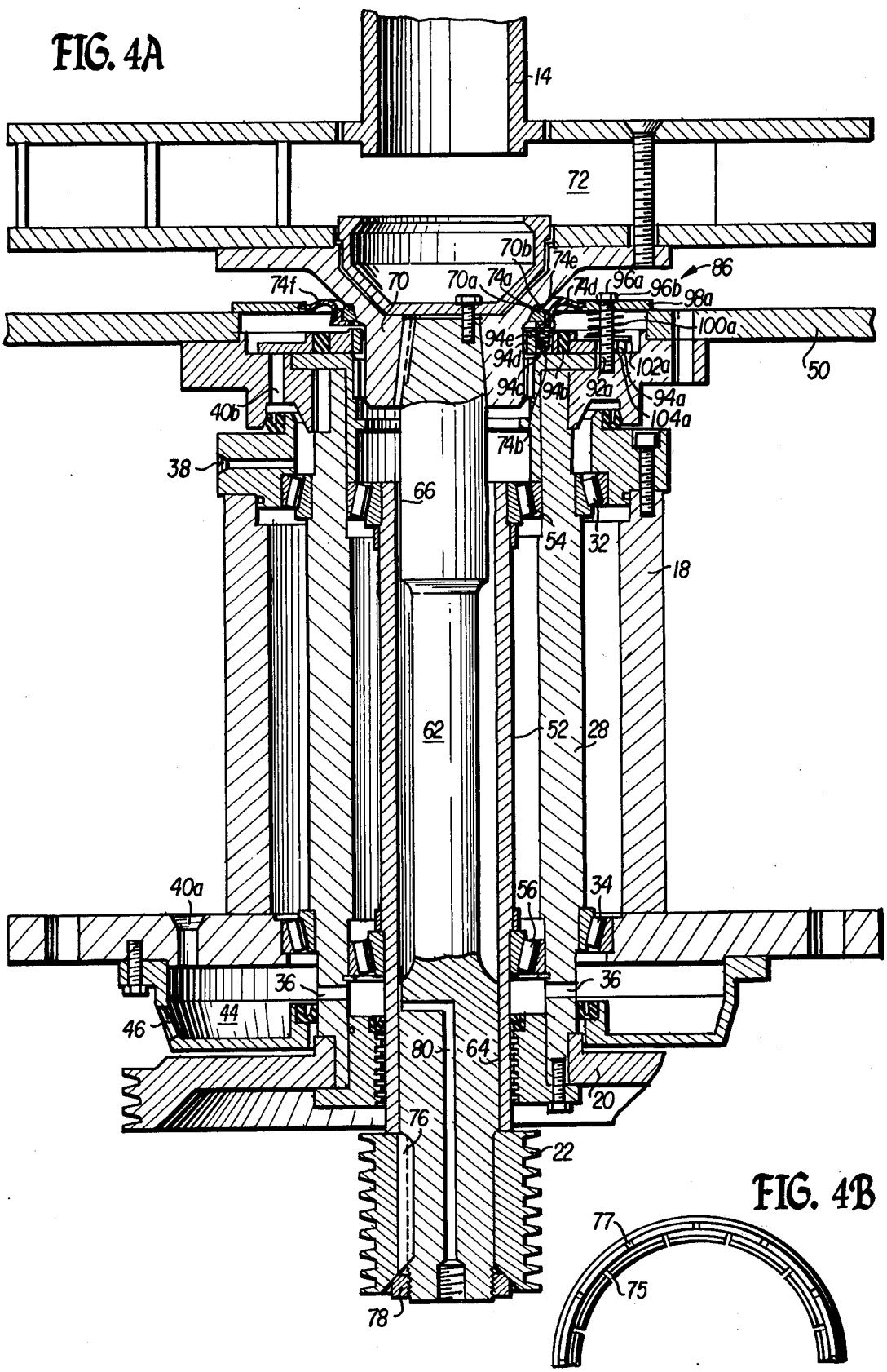
FIG. 4A shows an elevation view, in section, of another embodiment of the novel drive shafting and vibration damping features of the invention.
Figure 4B:
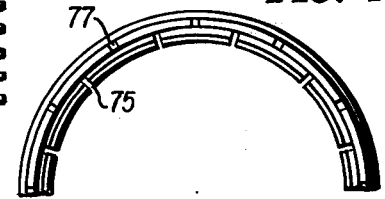
FIG. 4B shows a plan view of the oil seal and damper ring taken along line 4—4 of FIG. 4A.

For reducing the amplitude of vibration of cantilever shaft 62, impeller hub 70 and impeller 72 to acceptable limits while passing through critical speeds, applicant has found the embodiments of the invention shown in FIGS. 4, 4A and 4B to be quite successful. The shafting arrangement shown in FIG. 4 is identical to that shown in FIG. 2 in all respects except for the addition of a mechanical vibration and whirl damper generally indicated at 86 and a hydraulic whirl damper generally indicated at 88. The details of the hydraulic damper 88 are discussed with regard to FIGS. 6 and 7. Mechanical vibration and whirl damper 86 is attached below impeller 72 to bearing and seal retainer 90 via a plurality of circumferentially spaced tapped bores 92 in bearing and seal retainer 90. An essentially flat damper ring 94 is resiliently maintained in frictional contact with the upper surface of bearing and seal retainer 90 via bolts 96, washers 98, biasing springs 100, and washers 102. Bolts 96 extend through enlarged bores 104 of damper ring 94 into threaded engagement with tapped bores 92 in bearing and seal retainer 90. Thus, when cantilever shaft 62, impeller hub 70 and impeller disk 72 moves radially as the impeller is accelerated past a critical frequency, contact is made between impeller hub 70 and the inner diameter of damper ring 94. Due to the frictional resistance established between damper ring 94 and bearing and seal retainer 90 by bolts 96 and springs 100, damper ring 94 moves radially and thus provides resistance to the radial movement of impeller hub 70 an acceptable limit defined by bores 104, as impeller hub 70 moves with the bore of retainer 90. The amount of resistance provided by damper ring 94 may be adjusted as desired by simply adding more washers 102 or tightening bolts 96 to increase the frictional engagement between damper ring 94 and bearing and seal retainer 90; however, care must be taken not to over tighten bolts 96 as this may rigidize the system and lead to the same undesirable vibration achieved with no damper ring at all, as previously discussed.

Figure 5A:
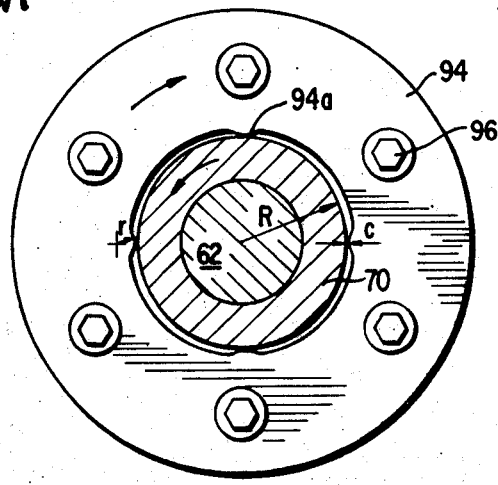
FIGS. 5A, 5B and 5C show enlarged plan views taken along line 5—5 of FIG. 4, indicating the unique features of alternate embodiments of one of the mechanical vibration dampers of the invention.
Figure 5B:
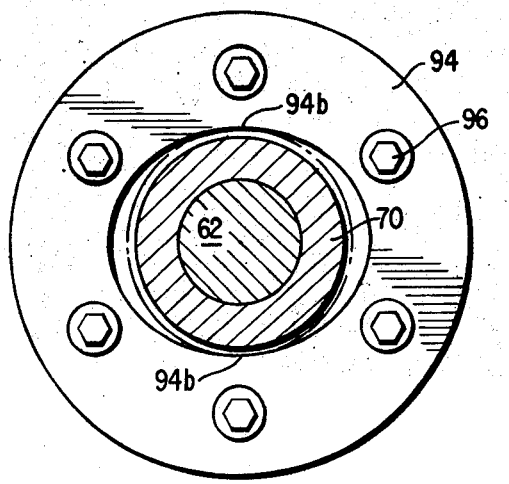
Figure 5C:
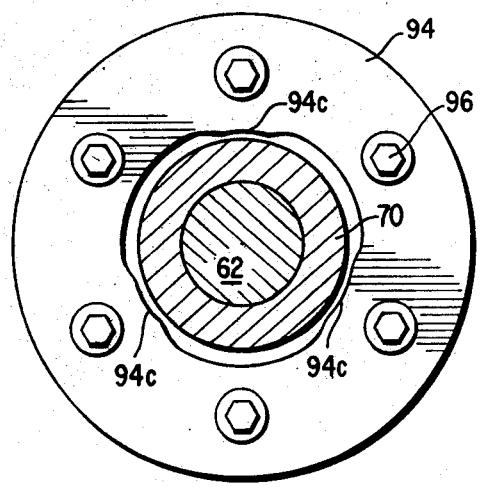

FIGS. 5A, 5B and 5C show views, partially in section, taken along line 5—5 of FIG. 4. The upper surface of damper ring 94 is shown, along with the geometry of the damper ring at its inner diameter. It has been found that a solid damper ring of the type shown in FIG. 4 having a plane, circular inner bore will provide adequate vibrational damping to prevent excessive vibration as the system is accelerated past a critical frequency, as discussed above. Applicant has discovered, however, that once beyond the critical frequency, instabilities and self-excited vibrations, plus the gyroscopic nature of the cantilever shaft 62 and heavy impeller 72, introduce new variables into the operation of the centrifugal crusher. One skilled in the mechanical arts will recall that the angular movement of a gyroscope rotor may be considered analytically, using the familiar right hand screw convention, as a vector extending in the direction to which the thumb points when the fingers of the right hand curl in the direction of rotation of the rotor. Similarly, any moment or torque applied to the gyroscope may be considered as a vector oriented in the same manner. A basic principle of gyroscopic motion is that any torque or moment applied to the gyroscope will cause the gyroscope to precess or whirl in such a direction that the angular movement or spin, vector of the gyroscope will tend to move in the direction of the moment or torque vector. That is, the spin vector "chases" the torque vector.

It has been observed that the impeller is sometimes subjected to uneven loading such as might be caused by delivery of material to be crushed down only one side of inlet hopper 14, which creates an imbalance in the load moving on the counterclockwise rotating impeller. Then, acting under the influence of the restoring moment exerted by shaft 62 and apparently behaving in the manner of a gyroscope, the impeller will tend to drift radially while whirling in a clockwise direction and may come into contact with the inside diameter of damper ring 94. At elevated speeds, countervailing hysteretic whirl may be induced which decreases clockwise whirl velocity. Due to the eccentric movement of the impeller shaft 62 as its upper end, any contact with the bore of damper ring 94 will generally occur over less than one revolution of shaft 62. Once radial movement and clockwise whirl of impeller 72 and shaft 62 commence, it is thought that one of the following may occur: First, the radial velocity imparted to impeller 72 by uneven loading or other factors may be low enough that the restoring moment exerted by shaft 62 will be sufficient to overcome self-induced effects such as hysteretic whirl and prevent contact with damper ring 94. This would cause impeller 72 to whirl on an essentially decreasing spiral until the upper end of shaft 62 returns to its original, slightly eccentric path.

Second, the radial velocity imparted to impeller 72 may be sufficient to cause hub 70 to contact damper ring 94 lightly whereby the damper ring applies some reaction force radially to hub 70. This reaction force applies a moment to the impeller 72 in opposition to that exerted by shaft 62, which tends to induce a counter-clockwise whirl in impeller 72. As previously mentioned, hysteretic whirl may also be induced. Thus, the clockwise whirl velocity and angular momentum caused by the restoring moment of the shaft 62 will be reduced to some extent, depending on the rotational speed and radial velocity at the time of impact and the resultant reaction forces. Further such contacts are thought to occur with the eventual result that the clockwise whirl velocity is essentially eliminated, thus permitting the upper end of shaft 62 to return to its original, slightly eccentric path.

Thirdly, it is thought that the radial velocity imparted to impeller 72 may in some cases be high enough that the reaction forces applied by successive contacts with damper ring 94 are sufficient not only to stop clockwise whirl, but also to establish counter-clockwise whirl of impeller 72. Once actual whirl begins in the same counter-clockwise direction as the rotation of impeller 72, it has been observed that impeller hub 70 will frequently tend to drift into and remain in contact with the inner bore of damper ring 94, particularly if the damper ring is solid and its inner bore is circular. The kinetics of the system which cause this behavior with the circular damper ring bore are complex; however, it is thought that increased centrifugal forces perhaps resulting from hysteretic whirl are a strong factor in inducing the continued contact. Continued contact, of course, results in continued radial forces applied by damper ring 94, which in turn maintain the counter-clockwise whirl. Since the cantilever shaft 62, impeller hub 70 and impeller disk 72 will continue to precess counter-clockwise about a circular inside diameter of a solid damper ring 94 once such contact has been established, undesired cyclic loading of the cantilever shaft 62 and excessive wear to the inside diameter of the damper ring 94 would result from continued operation with a circular bore damper.

Applicant has discovered that if at least a momentary loss of contact is induced between impeller hub 70 and the circular inner diameter of a solid damper ring 94, the undesirable cyclic loading and wear are substantially eliminated. The loss of contact interrupts the radial reaction forces acting on the impeller and, at all but the higher operating speeds, gives the shaft reaction forces a chance to return the shaft to its normal slightly eccentric position. The inclusion of surface discontinuities on the inner bore of damper ring 94 which alter its configuration to a non-circular shape having sectors of minimum and maximum radius will cause impeller hub 70 at least momentarily to lose contact with the inner diameter of the damper ring 94 as hub 70 moves from sectors of minimum radius to sectors of relatively larger radius in its traverse around the inner diameter of damper ring 94. This is because hub 70 will tend to depart the minimum radius sectors along a tangent and "hop" over at least a portion of the larger sectors. These periods of non-contact eliminate the radial reaction forces tending to maintain impeller hub 70 in contact with damper ring 94 and permit the opposing moment exerted by the cantilever impeller shaft 62 to begin to restore the impeller hub 70 and impeller 72 to a more central rotating position.

A variety of non-circular central bores for the damper ring 94 have been shown to have beneficial effects for eliminating the undesirable whirl of the impeller hub and shaft. Central bores having one or more surface discontinuities or "bumps" extending radially inwardly toward the center of the damper ring have also proven successful, as shown in FIG. 5A. A damper ring having only one such "bump" has been shown to be effective in reducing the whirl of the impeller and its cantilever shaft; however, applicant has found that the provision of four equally spaced "bumps" on the inner bore of damper ring 94 achieves improved results in reducing counter-clockwise whirl over a substantial speed range. The additional of more bumps also improves the reduction of critical frequency vibration by providing a larger contact surface for hub 70 as the system passes through critical speeds.

As indicated in FIG. 5A, these discontinuities may comprise cylindrical ridges 94A extending along the axial length of the damper ring 94. Regarding the embodiment of FIG. 5A, it has been found that a radius "r" for the cylindrical discontinuities 94A of approximately one-tenth the radius R of the impeller hub is a sufficient means for interrupting the reaction forces tending to maintain impeller hub 70 in contact with damper ring 94, to effectively eliminate the undesirable counter-clockwise whirl and its attendant deleterious effects. The minimum clearance "C" between the peaks or minimum radius points of surface discontinuities 94A and the outside diameter of impeller hub 70 may be chosen as necessary to permit sufficient radial movement of impeller hub 70 to allow the impeller to rotate about its center of gravity without contacting the damper ring at any times except when the system is passing through a critical frequency. This ensures adequate damping at the critical frequency. The exact amount of clearance required in a particular application will, of course, depend upon considerations such as the geometry of the cantilever shaft 62, its material, its desired fatigue life, the amount of eccentric movement required for self-centering and related factors, as will be apparent to one of ordinary skill in the art. In practice, the applicant has found that the surface discontinuities may be built up on the inner diameter of the damper ring 94 by the simple deposition of a weld metal such as bronze; however, it will be apparent that alternative approaches could be used such as the inclusion of inserts of suitable bearing material, including Teflon or Nylon.

Central bores which are elliptical in shape also have proven successful, as shown in FIG. 5B, where the minor axis of elliptical inner bore is chosen to ensure the minimum clearance "C" mentioned above. The minor axis points 94B thus constitute the minimum radius points of damper ring 94.

FIG. 5C shows a further embodiment of damper ring 94 which includes the required points of minimum radius of surface discontinuities 94C to provide the necessary damping. Discontinuities or sections 94C may be essentially randomly located around the circumference of damper ring 94; however, a symmetrical arrangement is considered preferable. Sectors 94C have a minimum radius of curvature no smaller than required for the minimum clearance to ensure damping at critical frequencies as discussed above. However, the portions of the bore between sectors 94C may have any larger radius compatible with the location of the enlarged bores 104 for bolts 96. Sectors 94C may also be flat rather than curved, so long as the minimum required clearance is provided. Thus, contact with impeller hub 70 is interrupted between sectors 94C, resulting in the desired elimination of the reaction forces and leading to the restoration of the impeller to a more central position.

Centilever shaft 62 preferably is sized so that its first critical speed is from one half to one fifth of the desired operating speed. This ensures that the rotor will self center. Moreover, for a shaft with these characteristics, the loads transmitted by the shaft at operating speed are markedly less, for a given unbalance, than the loads transmitted at operating speeds near or below the first critical speed. Also, to avoid extreme conditions of rotor wobble and multiple shaft bending, the second critical speed of the shaft should be well above the operating speed of the machine, preferably about 50 percent greater. Damper rings 94 will permit a certain maximum deflection of shaft 62 while it moves through the first critical speed as limited by bolt hole 104; however, contact with bolts 96 is clearly undesirable. So, shaft 62 is sized to have a maximum allowable deflection, without inducing a permanent set, which is slightly greater than the maximum movement permitted by damper rings 94. The deflection permitted by damper rings 94 and the allowable deflection of shaft 62 are maximized within the space limitations of the machine so that the force transmitted to the damper rings at critical speed is minimized.

While the damper rings shown in FIGS. 5A, 5B and 5C are successful for damping radial vibration and for substantially eliminating whirl at speeds greater than the first critical speed, at very high operating speeds more than four times the first critical speed, for example, the solid damper ring and its surface discontinuities may experience rather high rates of wear. The dynamics of machine operation in this speed range are complex; however, it is thought that the instabilities and self-excited vibrations previously described become dominant at such speeds; whereas, their impact is less noticeable at lower speeds.

The embodiment of the invention shown in FIGS. 4A and 4B includes an alternate type of damper ring suited for use in damping lateral vibrations as the machine rotates through critical speeds and for substantially eliminating whirl of the shaft and impeller even at very high operating speeds. The basic geometry of this embodiment is identical to that shown in FIG. 4, as indicated by the identical reference numerals, except for the changes made in vibration and whirl damper 86, omission of hydraulic damper 88 and oil seal 74 and modifications to the lubrication system.

Vibration and whirl damper 86 comprises an annular steel flange or mounting ring 94a having a plurality of enlarged bores 104a arranged around the circumference thereof. Bonded to the inner diameter of flange 94a is an annular layer 94b of rubber or similar material, such as Flexane 60, a self curing flexible urethane made by Decron Company. Rubbers having a hardness of about 60 durometer and a compression set of about 70% are preferred. However, other resilient means such as leaf or coil springs may be used without departing from the invention. A steel bushing support ring 94c is bonded to the inner diameter of layer 94b and supports a vibration damper bushing 94d of oil impregnated carbon graphite, of the type commonly used in carbon bearings or face seals. This material minimizes undesirable friction when shaft 62 contacts bushing 94d. Support ring 94c includes in its upper surface a plurality of counter bores 94e arranged around the circumference thereof. The clearance to shaft 62 is slightly larger than that required to account for eccentric movement during self-centering above the first critical speed.

Flange 94a is resiliently maintained in frictional contact with the upper surface of retainer 90a via a flat spring retainer ring 98a resting on the top of disk 50 and a plurality of bolts 96a and nuts 96b which compress springs 100a into contact with washers 102a. Bolts 96a pass through bores 104a to engage tapped bores 92a in retainer 90a. Thus, when cantilevers shaft 62, impeller hub 70 and impeller disk 72 move radially as the impeller is accelerated past a critical frequency, contact is made between impeller hub 70 and the inner diameter of damper bushing 94d. Hub 70 is preferably chrome plated to reduce friction. Due to the resiliency of layer 94b, bushing 94d moves radially to absorb a portion of the energy of the moving impeller, thereby preventing the impeller from moving beyond an acceptable limit. Under extreme conditions flange 94a may also move radially within limits defined by bore 104a.

A combined oil seal and damper ring 74a is supported above bushing 94d by a plurality of springs 74b which seat in bores 94e. Ring 74a is supported by a circular collar 74c which includes a plurality of counter bores 74d for receiving the upper ends of springs 74b. The interior bore of ring 74a is tapered to mate with a corresponding chrome plated conical suface 70a on impeller hub 70. An annular lip 74e extends upwardly from ring 74a to contact chrome plated horizontal surface 70b on hub 70.

The tapered interior bore of ring 74a and annular lip 74e cooperate to maintain ring 74a properly oriented relative to hub 70. As the tapered bore wears, ring 74a is prevented from jamming against hub 70 by lip 74e. Thus, the temperature of ring 74a is prevented from rising due to excessive friction. Conversely, excessive wear of lip 74e is prevented by contact of the tapered bore with surface 70a. Thus ring 74a is maintained in constant sliding contact with hub 70, to provide an oil seal and some damping of radial movement. A flexible diaphragm or gasket 74f extends between ring 74a and retainer ring 98a to minimize oil leakage past the seals and provide additional damping. Ring 74a is made from U.S. Graphite Graphitar Grade 80, for example, so that it will cause minimal friction and yet provide an adequate oil seal.

Because seal and damper ring 74a is in constant contact with hub 70, there is a need to provide adequate lubrication both to reduce friction and to maintain the temperature of the ring within acceptable limits. To facilitate this, a flow of low pressure air is introduced into oil collection volume 44 through port 40a while oil is pumped into the machine through passages 38 and 80. From passage 80, oil flows upwardly inside sleeve shaft 52, over the top edge of shaft 52, downward through bearings 54 and 56 and out through passage 36 to collection volume 40. From passage 38, oil flows downwardly through bearings 32 and 34 into collection volume 40. Simultaneously, air flows through passage 40a, countercurrently through passage 36 and up through bearings 56 and 54 to the region of the rings 74a and 94a. As the air moves upward in the machine, some oil mist or vapor is entrained which covers rings 74a and 94a as the small air flow (about 1 to 15 inches of water pressure) escapes through the clearance of rings 74a and 94d. The air flow also helps to keep dust from working beneath seal ring 74a.

FIG. 4B shows additional details of damper and seal ring 74a which facilitate air and oil flow. A plurality of equally spaced grooves 75 in the tapered contact surface of ring 74a provide a small flow path past surface 70a. A plurality of equally spaced staggered radial grooves 77 in the top surface of annular lip 74e provide a flow path past surface 70b. Alternatively, passages (not shown) could be provided in hub 70 to permit air to bleed of from above seal ring 74a. Any oil trapped below ring 74a returns to collection volume 40 via passages 40b.

Damper rings 74a and 94a – 94d not only damp radial vibration of impeller 72 as it passes through critical speeds but also, essentially eliminate any higher speed whirl due to the gyroscopic effects, instabilities and self-excited vibrations previously discussed herein. Although the mechanism by which whirl is eliminated is complex, it is thought that the energy absorbing characteristics of layer 94b are so effective in absorbing forces acting on shaft 62 that the self-induced vibrations and whirl are overcome. Ring 74a also adds some radial damping. In contrast to this, the damper rings 94 shown in FIGS. 5A to 5C absorb a much smaller amount of energy upon initial contact because rings 94 do not move radially unless subjected to rather high loads. Loosening bolts 96 to enable rings 94 to move more easily would permit more energy absorption at higher speeds; however, the damping at critical speeds would then be insufficient.

FIGS. 6 and 7 show the details of the hydraulic whirl damper according to the invention. As shown in FIG. 6, a plurality of blind holes 108 is provided in the upper end of cantilever shaft 62 on the same center-line locations as the radial oil channels 82 discussed with regard to FIG. 2. A groove in shaft 62 will also suffice. Within radial oil channels 82 are placed a plurality of sleeves 110 which extend from radial oil channels 82 across the clearance between inner sleeve shaft 52 and cantilever shaft 62 and into holes 108 as shown, leaving sufficient radial and diametral clearance at end 111 of sleeves 110 to allow for maximum anticipated radial and torsional deflection of cantilever shaft 62. Sleeves 110 act as a dam for oil which is flowing along a generally spiral path upwardly on the inner diameter of inner sleeve shaft 52 as indicated schematically in FIG. 4. Before the oil flowing up inner shaft 52 may exhaust through radial oil channels 82, the damming effect of sleeves 110 causes the thickness of the oil film to increase to a depth greater than the clearance existing between cantilever shaft 62 and inner sleeve shaft 52 at their upper ends. Thus, the clearance between the shafts at this location will be constantly maintained substantially full of lubricating oil. The lubricant vicosity, surface finish of the shafts and clearance may be adjusted to optimize the friction drag forces of the moving lubricant relative to the velocity head forces acting to resist motion of shaft 62 and thereby optimize the resultant forces acting on shaft 62.

The significance of this feature is shown schematically in FIG. 7 where the impeller shaft 62 is shown as having been shifted due to uneven loading to the right hand side of the inner diameter of inner sleeve shaft 52. Assuming no contact of impeller hub 70 with retainer 90, clockwise whirl of the impeller will result. Due to the movement of shaft 62 the clearance between the two shafts is reduced as shown. Because the oil flowing along the inner diameter of sleeve shaft 52 has a velocity about the inner diameter due to the rotation of shaft 52 in the direction shown, the oil entering area 112A of reduced clearance experiences a rise in local pressure; whereas the oil leaving area 112B of reduced clearance experiences a drop in local pressure. In addition, the movement of sleeves 110 within holes 108 creates a hydraulic shock absorbing effect since sleeves 110 act as small pistons in holes 108 and bores 82 restrict the flow of oil radially to the annulus between shaft 52 and 28. These factors produce a resultant force acting approximately in the direction of the arrow R as shown in FIG. 7. Due to the gyroscopic nature of the rotating impeller 72 and its cantilever drive shaft 62, the resultant force R caused by the pressure differential developed across impeller shaft 62 will result in a moment applied to shaft 62 and impeller 72 which has a moment vector $M_F$ in a direction perpendicular to force R. The effect of the moment caused by force R is to tend to move the impeller hub 70 away from contact with bearing and seal retainer 90, toward the center of sleeve shaft 52, in a direction opposing the existing whirl. This is a form of fluid bearing whip. The corrective effect of the hydraulic damper according to the invention is a continuously acting one beyond critical speed, so long as the impeller shaft is deflected as shown in FIG. 7 and provides an additive damping effect to that provided by the mechanical vibration and whirl damper 86 discussed with regard to FIGS. 4 and 5. Generally, the hydraulic damper is not needed in the embodiment of FIGS. 4A and 4B; however, its use there is within the scope of the invention.

Figure 8:
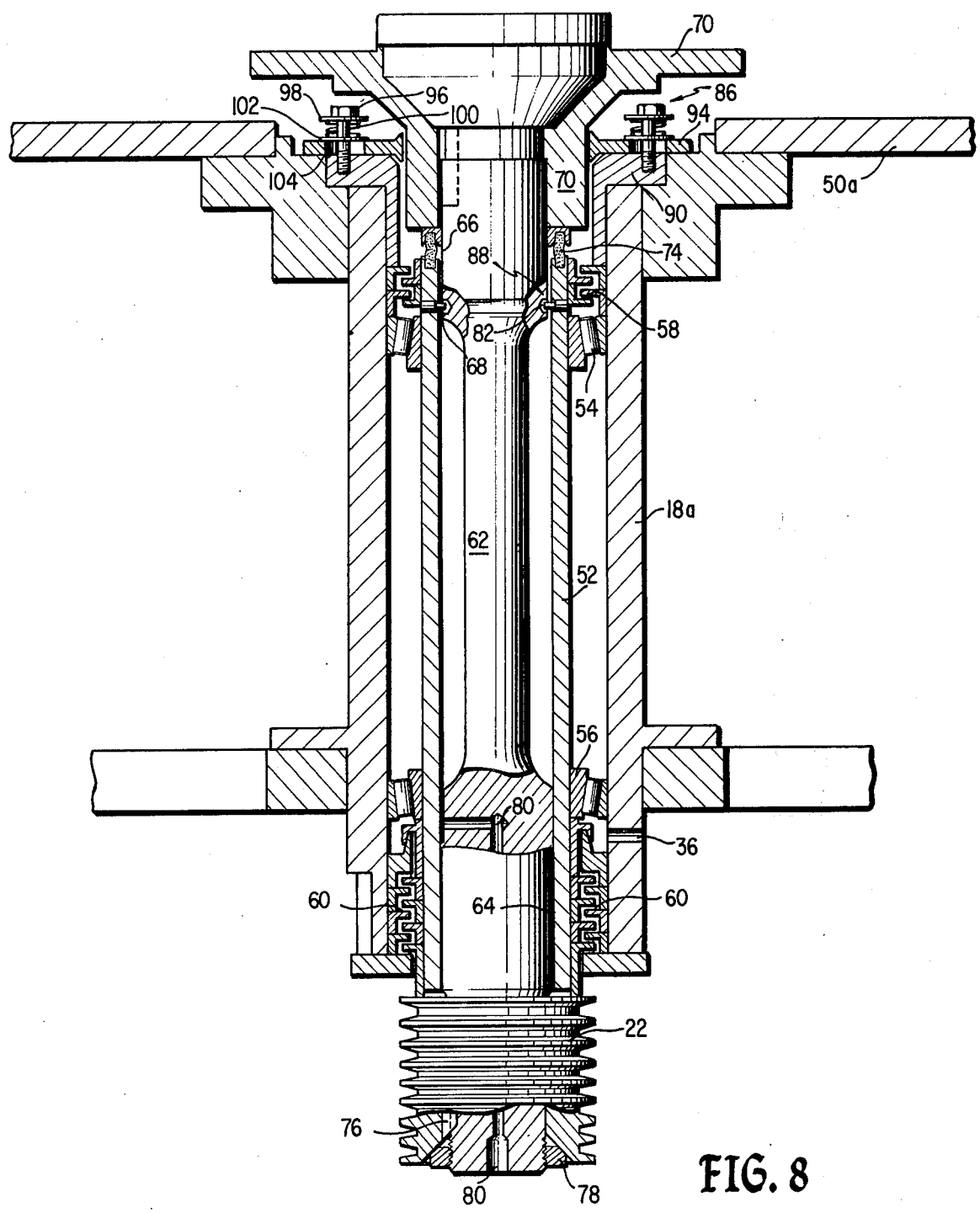
FIG. 8 shows an elevation view, in section, of another embodiment of the novel drive shafting and vibration damping features of the invention.

FIG. 8 shows an embodiment of the invention adapted for use in centrifugal crushing machines or similar applications in which the impactor surrounding the impeller is a stationary one or in which the impactor is driven by means other than a drive shaft concentric and coaxial with the impeller drive shaft. Thus, FIG. 8 shows an impeller drive shafting arrangement in which the outer sleeve shaft 28 as shown in FIGS. 2 and 4 has been omitted and the inner sleeve shaft 52 is mounted for rotation directly within a cylindrical shaft housing 18A. A stationary impactor support disk or housing 50A might be attached to the upper end of a shaft housing 18A as indicated. The remaining components of this embodiment of the invention continue to function in a manner identical to those previously described.

Figure 9:
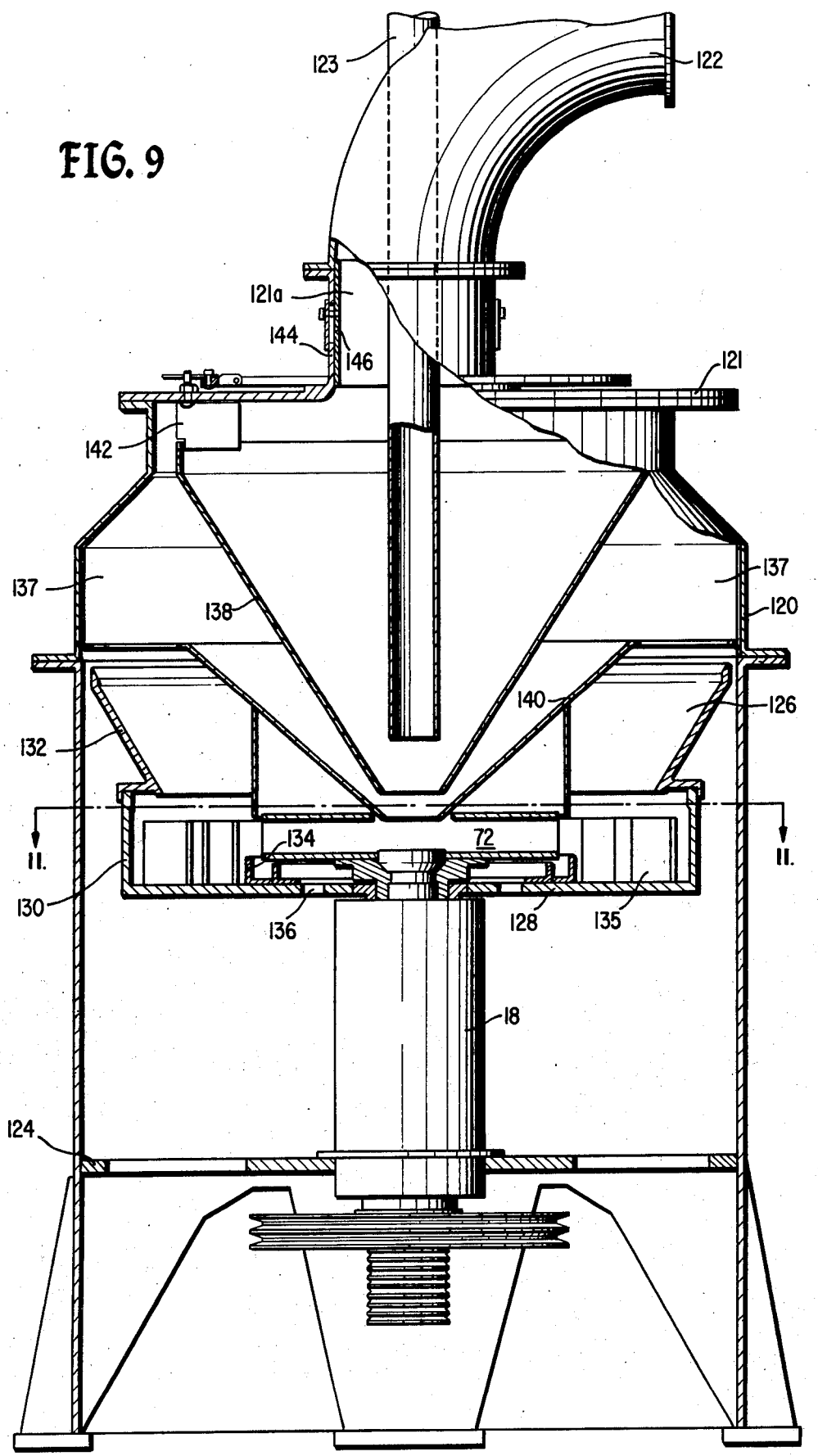
FIG. 9 shows an elevation view, in section, of another embodiment of the invention in which provision is made for internal recirculation and classification of the crushed product to produce a pulverized product.

FIG. 9 shows an elevation view, in section, of another embodiment of a centrifugal crushing machine according to the invention in which provision has been made for internal recirculation and classification of the crushed product to produce a pulverized product. The overall function of an earlier centrifugal crusher incorporating similar provisions for separation and classification is shown in U.S. Pat. No. 3,162,382. As shown in FIG. 9, the centrifugal pulverizer comprises a cylindrical housing 120 having thereon a cap or cover 121 which includes a central opening 121A for receiving the product discharged at duct 122 and also the input or feed to duct 123, the vertical portions of ducts 122 and 123 being concentric. Housing 120 includes an interior floor 124 on which are mounted cylindrical shaft housing 18, outer sleeve shaft 28, inner sleeve shaft 52, cantilever shaft 62, and their associated components exactly as discussed with respect to FIG. 4. Shaft 62 and sleeve shaft 52 are adapted to be driven independently, either in opposite directions or in the same direction, but with the impeller shaft at substantially higher speed, as previously discussed.

Bowl 126 is adapted to be driven rotationally by outer sleeve shaft 28 and is shown to comprise three sections; a lower section 128, a middle section 130 and an upper section 132. The lower section 128 of bowl 126 comprises a generally flat circular floor supported by sleeve shaft 28 and having a central opening through which the impeller drive shaft 62 passes. On the floor, intermediate its outer portion and the impeller drive shaft 62 is an annular shroud 134 which prevents back flow of crushed material to vents 136 located between annular shroud 134 and the central hole occupied by the impeller shaft 62. Vents 136 are provided at spaced intervals along an annular path around the impeller drive shaft 62. The middle section 130 of bowl 126 comprises an essentially vertical wall section which is joined to upper section 132. Upper section 132 inclines outward and upward at an angle, preferably 35 degrees from the vertical, as discussed in U.S. Pat. No. 3,162,382.

Mounted within bowl 126 on impeller drive shaft 62 and driven rotationally thereby is impeller 72. Mounted in the space driven the outer periphery of impeller 72 and the vertical wall of middle section 130 are a plurality of impact targets or vanes 135 which are spaced circumferentially from one another and oriented relative to the path of particles leaving impeller 72 so that the particles will strike vanes 135 at essentially a right angle, as discussed further with regard to FIG. 11. As discussed with respect to FIG. 1, the radial spacing of vanes 135 from impeller 72 affects the proportion of very fine particles found in the product leaving the vanes 135.

Four spaced apart directional vanes 137 support a pair of coaxial stationary cones, an upper cone 138 and a lower cone 140. Lower cone 140 is secured to the lower inclined edge of vanes 137, as by welding, with its lower circular edge just above the opening leading to the impeller 72. Upper cone 138, which is shown attached to the upper inclined edge of directional vane 137, terminates at its lower end, the lower circular edge of which is located above the opening leading to the impeller 72 and also above the lower circular edge of cone 140.

Pivotally secured to cover 121 of housing 120 are a plurality of classification vanes 142 spaced apart along an annular path. These vanes 142 depend from the cover 121 and occupy positions just above the upper edge of upper cone 138. The radial position of these vanes is adjustable and is one of the factors which control the particles size of the material carried out the discharge conduit 122, as discussed in U.S. Pat. No. 3,162,382.

Secured to flange 144 in cover 121 and adjustable vertically within the vertical portion of discharge conduit 122, and depending coaxially therefrom is a classification sleeve 146, the position of which is another factor in controlling the particle size of the product delivered from the pulverizer. The feed tube 123 is vertically disposed above and along on the axis of the cylindrical housing 120, extending down into housing 120 coaxially through upper cone 138 to a point above above the annular opening to the impeller 72. Located at a level below the floor of the bowl 136 and the wall of housing 120 is an air input duct through which air is forced as by a blower, not shown.

In operation, the particles of material, such as ore, rock, pigment, clay and so forth which are to be reduced to a preselected size are fed, as from a hopper, into vertically disposed feed tube 123. The material flows down the feed duct 123 and into the annular opening leading to the impeller 72. These particles fall onto the floor of the rapidly rotating impeller 72 and are thrown out by centrifugal force at a high rate of speed toward oppositely rotating impact vanes 135 arranged around impeller 72. The speed at which the thrown particles leave the impeller is substantially equal to the peripheral speed of the rotating impeller. In a typical case, impeller 72 may be rotated at from 2,400 to 6,000 r.p.m. and the impact vanes at 300 to 400 r.p.m. The crushed material leaving the impact vanes 135 is then carried upwardly through the device and separated and classified by cones 138 and 140 and directional vanes 137 to produce a desired fineness of the product ultimanely discharged through duct 122.

Figure 10:
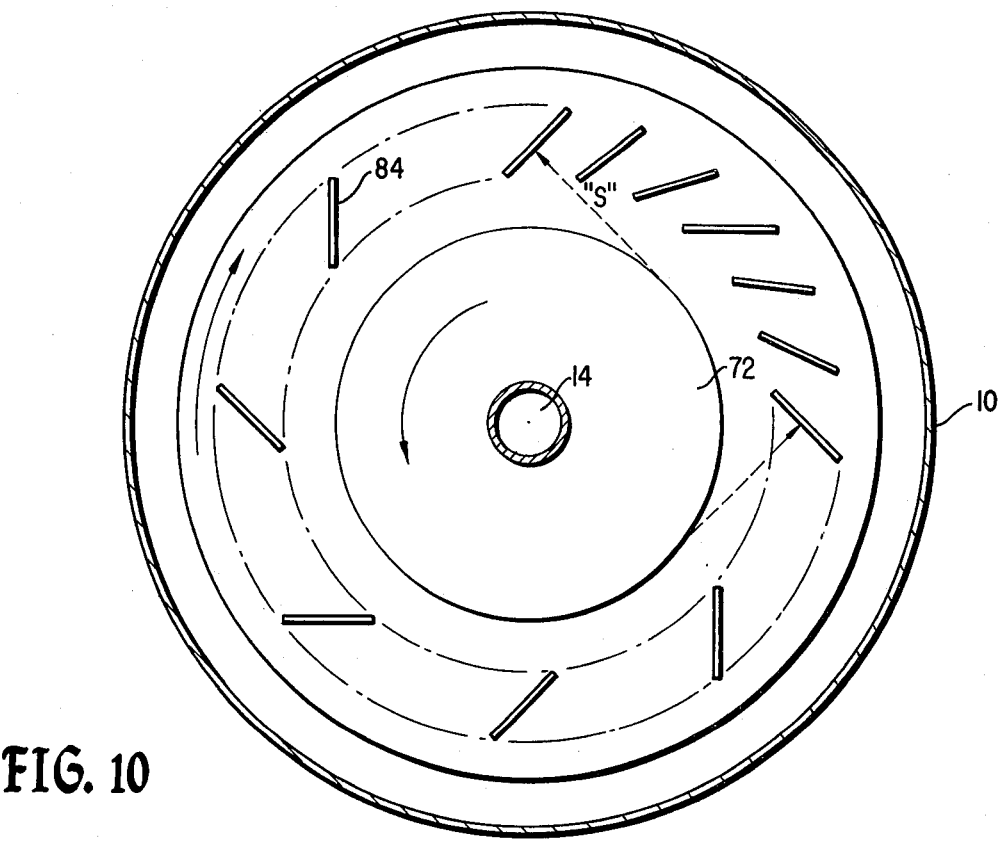
FIG. 10 shows a section taken along line 10—10 of FIG. 1, indicating the unique arrangement of impact targets according to one embodiment of the invention.
Figure 11:
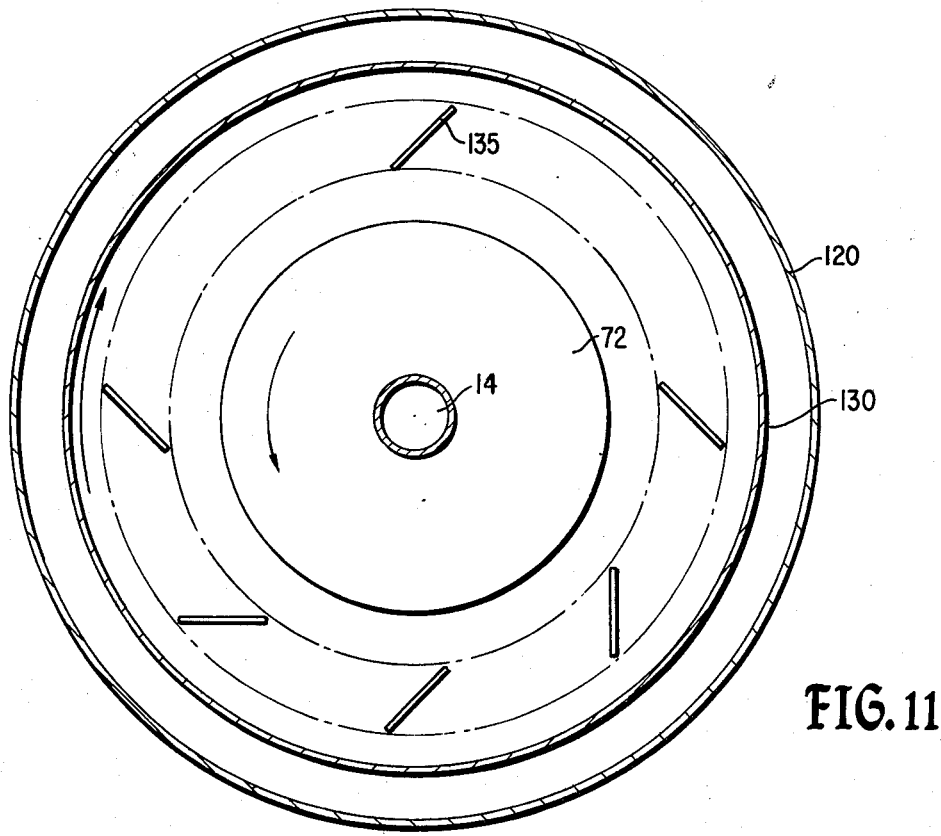
FIG. 11 shows a section taken along line 11—11 of FIG. 9, indicating the unique arrangement of impact targets according to another embodiment of the invention.

FIGS. 10 and 11 show sectional views taken along lines 10—10 and 11—11 of FIGS. 1 and 9, respectively, indicating the orientation of impactor vanes 84 and 135, respectively, relative to the tangential path of particles of material thrown from rotor 72. For simplicity, only a few vanes 84 and 135 are shown, it being understood that such vanes are arranged completely around the impeller. As shown, the impactor vanes or targets 84 and 135 are placed so that particles leaving impeller 72 essentially along a tangent line as shown in phantom will strike the impact blades or targets at essentially a right angle. The right angle impact is preferred in the invention since it is believed that this orientation both maximizes the force acting to crush particles striking the vanes 84 or 135 and minimizes impactor wear due to reduced scuffing of the impactors; however, impact angles in the range of 80° to 110° are acceptable. The vanes 84 and 135 are also spaced circumferentially each from the other and radially from the surrounding housing wall 10 as in FIG. 10 or middle section 130 of bowl 126 as in FIG. 11. This placement of the impactor vanes insures that material crushed on each vane may escape radially outwardly between the vanes and be carried from the crushing area for further processing, as shown in FIGS. 1 and 9. Also, this orientation of the impact vanes permits the rotating impactors to function collectively as a centrifugal blower which tends to draw air through the space between adjacent impact vanes and thereby sweep each vane of crushed material to prevent following particles from striking previously crushed particles retained on the impactor surfaces. This air flow thus minimizes the production of unwanted fines.

As previously mentioned, the radial spacing of the impactor vanes from the impeller plays a vital role in minimizing fines production, due to the effects of air resistance on lighter particles the impeller at high speeds. It has been observed in actual tests that for particle speeds from the impeller of about 400 feet per second and a tangential spacing "S" of about 10 inches between the impeller and the nearest impactor, a crushing machine embodying the impactors of the invention will produce a crushed product such as coal where the maximum fineness is 325 mesh, even after a plurality of passes through the crusher. Moving the impactors closer to the impeller will result in a higher percentage of fines; whereas, moving the impactors further from the impeller will result in a lower percentage of fines. Increasing impeller speed to increase the percentage of fines has little effect since the air resistance goes up as the square of the particle velocity. The increased air resistance either reduces particle velocity to a point where no impact occurs or to a point where the impact produces no further crushing.

Having described my invention in sufficient detail to enable one of ordinary skill in the art to make and use it, I claim:

1. A drive shafting apparatus suitable for use in machines including a high speed rotating impeller or similar element, comprising:
   an outer sleeve shaft adapted to be mounted for rotation within said machine;
   an inner, cantilever shaft rigidly connected at one end of said cantilever shaft within said outer sleeve shaft and having substantial radial play within said sleeve shaft at the other end of said cantilever shaft, said other end of said cantilever shaft being adapted for connection to said high speed rotating element for rotation therewith; and
   damper means situated about said other end of said cantilever shaft for reducing radial vibrartion of said cantilever shaft as it rotates through critical speeds and for substantially eliminating whirling of said cantilever shaft and high speed rotating element.

2. A drive shafting apparatus as claimed in claim 1, wherein said damper means comprises a ring mounted about said other end of said cantilever shaft and means for resiliently biasing said ring to allow limited radial deflection of said cantilever shaft during rotation.

3. A drive shafting apparatus as claimed in claim 1, including means for introducing flowing fluid into said sleeve shaft; wherein said damper means comprise:
   flow channel means for exhausting said fluid from said sleeve shaft; and
   means for causing said fluid to fill substantially the radial clearance between said sleeve shaft and said cantilever shaft in the region of said radial play.

4. A drive shafting apparatus as claimed in claim 2, including means for introducing flowing fluid into said sleeve shaft, wherein said damper means comprise:
   flow channel means for exhausting said fluid from said sleeve shaft; and
   means for causing said fluid to fill substantially the radial clearance between said sleeve shaft and said cantilever shaft in the region of said radial play.

5. A drive shafting apparatus as claimed in claim 2, wherein said ring comprises an inner bore adjacent the outer diameter of said cantilever shaft, said inner bore including means for inducing loss of contact between said cantilever shaft and said rotating element, and said inner bore, whereby said whirling is substantially eliminated.

6. A drive shafting apparatus as claimed in claim 5, including means for introducing flowing fluid into said sleeve shaft, wherein said damper means further comprises:
   flow channel means for exhausting said fluid from said sleeve shaft; and
   means for causing said fluid to fill substantially the radial clearance between said sleeve shaft and said cantilever shaft in the region of said radial play.

7. A drive shafting apparatus as claimed in claim 1, wherein said damper means comprises an inner bushing spaced from said cantilever shaft; resilient means surrounding said bushing for absorbing energy imparted to said bushing by contact with said cantilever shaft; an outer mounting ring surrounding said resilient means; and means for resiliently biasing said mounting ring to permit limited radial deflection thereof.

8. A drive shafting apparatus as claimed in claim 7, wherein said means for absorbing comprises a layer of resilient material between said bushing and said mounting ring.

9. A drive shafting apparatus as claimed in claim 1, wherein said damper means comprises a ring surrounding said cantilever shaft and means for resiliently biasing said ring into contact with said other end of said cantilever shaft to limit radial deflection thereof during rotation.

10. A drive shafting apparatus as claimed in claim 9, wherein said cantilever shaft comprises a conical portion and a radially extending horizontal portion at said other end, and said ring comprises a conical face on its inner diameter and a horizontal face, said conical portion and said conical face and said horizontal portion and said horizontal face being biased into contact.

11. A drive shafting apparatus as claimed in claim 7, wherein said damper means further comprises a ring surrounding said cantilever shaft and means for resiliently biasing said ring into contact with said other end of said cantilever shaft to limit radial deflection thereof during rotation.

12. A drive shafting apparatus as claimed in claim 5, wherein said means for inducing loss of contact comprises a varying radius in said inner bore, whereby said loss of contact is induced as said shaft moves from contact with a portion of said bore having one radius to a portion of said bore having one radius to a portion having a larger radius.

13. A drive shafting apparatus suitable for use in machines including a high speed rotating impeller or similar element and a surrounding rotating bowl or similar element, comprising:
   an outer sleeve shaft adapted to be mounted for rotation within said machine and for connection to said surrounding rotating element for rotation therewith;
   an inner sleeve shaft mounted for rotation within said outer sleeve shaft;
   a central, cantilever shaft rigidly connected at one end of said cantilever shaft within said inner sleeve shaft and having substantial radial play within said inner sleeve shaft at the other end of said cantilever shaft, said other end of said cantilever shaft being adapted for connection to said high speed rotating element for rotation therewith; and
   damper means about said other end of said cantilever shaft for reducing radial vibration of said cantilever shaft as it rotates through critical speeds and for substantially eliminating whirling of said cantilever shaft and high speed rotating element.

14. A drive shafting apparatus as claimed in claim 13, wherein said damper means comprises a ring mounted to said outer sleeve shaft about said other end of said cantilever shaft and means for resiliently biasing said ring to allow limited radial deflection of said cantilever shaft during rotation.

15. A drive shafting apparatus as claimed in claim 13, including means for introducing flowing fluid into said inner sleeve shaft, wherein said damper means comprises:
   flow channel means for exhausting said fluid from said inner sleeve shaft; and
   means for causing said fluid to fill substantially the radial clearance between said inner sleeve shaft and said cantilever shaft in the region of said radial play.

16. A drive shafting apparatus as claimed in claim 14, including means for introducing flowing fluid into said inner sleeve shaft, wherein said damper means comprises:
   flow channel means for exhausting said fluid from said inner sleeve shaft; and
   means for causing said fluid to fill substantially the radial clearance between said inner sleeve shaft and said cantilever shaft in the region of said radial play.

17. A drive shafting apparatus as claimed in claim 14, wherein said ring comprises an inner bore adjacent the outer diameter of said cantilever shaft, said inner bore including means for inducing a loss of contact between said cantilever shaft and said rotating element and said inner bore, whereby said whirling is substantially eliminated.

18. A drive shafting apparatus as claimed in claim 17 including means for introducing flowing fluid into said inner sleeve shaft, wherein said damper means further comprises:
   flow channel means for exhausting said fluid from said inner sleeve shaft; and
   means for causing said fluid to fill substantially the radial clearance between said inner sleeve shaft and said cantilever shaft in the region of said radial play.

19. A drive shafting apparatus as claimed in claim 13, wherein said damper means comprises an inner bushing spaced from said cantilever shaft; resilient means surrounding said bushing for absorbing energy imparted to said bushing by contact with said cantilever shaft; an outer mounting ring surrounding said resilient means; and means for resiliently biasing said mounting ring to permit limited radial deflection thereof.

20. A drive shafting apparatus as claimed in claim 19, wherein said means for absorbing comprises a layer of resilient material between said bushing and said mounting ring.

21. A drive shafting apparatus as claimed in claim 13, wherein said damper means comprises a ring surrounding said cantilever shaft and means for resiliently biasing said ring into contact with said other end of said cantilever shaft to limit radial deflection thereof during rotation.

22. A drive shafting apparatus as claimed in claim 21, wherein said cantilever shaft comprises a conical portion and a radially extending horizontal portion at said other end, and said ring comprises a conical face on its inner diameter and a horizontal face, said conical portion and said conical face and said horizontal portion and said horizontal face being biased into contact.

23. A drive shafting apparatus as claimed in claim 19, wherein said damper means further comprises a ring surrounding said cantilever shaft and means for resiliently biasing said ring into contact with said other end of said cantilever shaft to limit radial deflection thereof during rotation.

24. A drive shafting apparatus as claimed in claim 17, wherein said means for inducing loss of contact comprises a varying radius in said inner bore, whereby said loss of contact is induced as said shaft moves from contact with a portion of said bore having one radius to a portion of said bore having one radius to a portion having a larger radius.

25. In a centrifugal crushing machine of the type in which an impeller is mounted for rotation within a bowl, the impeller being adapted to project particles of material toward the wall of the bowl, the bowl having a bottom wall extending radially from the impeller and a circumferential wall extending upwardly from the bottom wall, the improvement comprising:
- spaced impact targets arranged circumferentially on said bottom wall between said impeller and said circumferential wall, said targets being spaced radially from said impeller and said circumferential wall and presenting impact surfaces being oriented at an angle to the path of said particles whereby at least a portion of said particles are crushed by impact with said surfaces;
- a first sleeve shaft mounted for rotation within said machine;
- a central cantilever shaft rigidly connected at one end of said cantilever shaft within said first sleeve shaft and having substantial radial play within said first sleeve shaft at the other end of said cantilever shaft, said cantilever shaft being connected to said impeller for rotation therewith;
- damper means about said other end of said cantilever shaft for reducing radial vibration of said cantilever shaft as it rotates through critical speeds and for substantial eliminating whirling of said cantilever shaft and impeller.

26. The machine according to claim 25, wherein said bowl is mounted for rotation independently of said impeller, further comprising:
- a second sleeve shaft mounted for rotation within said machine and around said first sleeve shaft, said second sleeve shaft being operatively connected to said bowl for rotation therewith.

27. The machine according to claim 26, wherein said damper means comprises a ring mounted to said second sleeve shaft about said other end of said cantilever shaft and means for resiliently biasing said ring to allow limited radial deflection of said cantilever shafting during rotation.

28. The machine according to claim 27, wherein said ring comprises an inner bore adjacent the outer diameter of said cantilever shaft, said inner bore including means for inducing loss of contact between said cantilever shaft and said rotating impeller, and said inner bore, whereby said whirling is substantially eliminated.

29. The machine according to claim 25, including means for introducing flowing fluid into said first sleeve shaft, wherein said damper means comprise:
- flow channel means for exhausting said fluid from said first sleeve shaft; and
- means for causing said fluid to fill substantially the radial clearance between said first sleeve shaft and said cantilever shaft in the region of said radial play.

30. The machine according to claim 25, wherein said damper means comprises a ring mounted in said machine, about said other end of said cantilever shaft and means for resiliently biasing said ring to allow limited radial deflection of said cantilever shaft during rotation.

31. The machine according to claim 30, wherein said ring comprises an inner bore adjacent the outer diameter of said cantilever shaft, said inner bore including means for introducing loss of contact between said cantilever shaft and said rotating impeller, and said inner bore, whereby said whirling is substantially eliminated.

32. The machine according to claim 25, wherein said damper means comprises an inner bushing spaced from said cantilever shaft; resilient means surrounding said bushing for absorbing energy imparted to said bushing by contact with said cantilever shaft; and outer mounting ring surrounding said resilient means; and means for resiliently biasing said mounting ring to permit limited radial deflection thereof.

33. The machine according to claim 32, wherein said means for absorbing comprises a layer of resilient material between said bushing and said mounting ring.

34. The machine according to claim 25, wherein said damper means comprises a ring surrounding said cantilever shaft and means for resiliently biasing said ring into contact with said other end of said cantilever shaft to limit radial deflection thereof during rotation.

35. The machine according to claim 34, wherein said cantilever shaft comprises a conical portion and a radially extending horizontal portion at said other end, and said ring comprises a conical face on its inner diameter and a horizontal face, said conical portion and said conical face and said horizontal portion of said horizontal face being biased into contact.

36. The machine according to claim 32, wherein said damper means further comprises a ring surrounding said cantilever shaft and means for resiliently biasing said ring into contact with said other end of said cantilever shaft to limit radial deflection thereof during rotation.

37. The machine according to claim 30, wherein said means for inducing loss of contact comprises a varying radius in said inner bore, whereby said loss of contact is induced as said shaft moves from contact with a portion of said bore having one radius to a portion of said bore having one radius to a portion having a larger radius.

38. In a centrifugal crushing machine of the type in which an impeller is mounted for rotation within a housing, the impeller being adapted to project particles of material toward the wall of the housing, the improvement comprising:
- an impactor mounted within said machine and having a supporting wall extending radially from said impeller;
- spaced impact targets arranged circumferentially on said supporting wall, said targets being spaced radially from said impeller and said housing wall and presenting impact surfaces to particles projected from said impeller, said impact surfaces being oriented at an angle to the path of said particles, whereby at least a portion of said particles are crushed by impact with said surfaces;
- a first sleeve shaft mounted for rotation within said machine;
- a central cantilever shaft rigidly connected at one end of said cantilever shaft within said first sleeve shaft and having substantial radial play within said first sleeve shaft at the other end of said cantilever shaft, said cantilever shaft being connected to said impeller for rotation therewith;
- damper means about said other end of said cantilever shaft for reducing radial vibration of said cantilever shaft as it rotates through critical speeds and for substantially eliminating whirling of said cantilever shaft and impeller.

39. The machine according to claim 38, wherein said impactor is mounted for rotation independently of said impeller, further comprising:

a second sleeve shaft mounted for rotation within said machine and around said first sleeve shaft, said second sleeve shaft being operatively connected to said impactor for rotation therewith.

40. The machine according to claim 39, wherein said damper means comprises a ring mounted to said second sleeve shaft about said other end of said cantilver shaft and means for resiliently biasing said ring to cantilever limited radial deflection of said cantilever shaft during rotation.

41. The machine according to claim 40, wherein said ring comprises an inner bore adjacent the outer diameter of said cantilever shaft, said inner bore including means for inducing loss of contact between said cantilever shaft and said rotating impeller, and said inner bore, whereby said whirling is substantially eliminated.

42. The machine according to claim 38, including means for introducing flowing fluid into said first sleeve shaft, wherein said damper means comprises:

flow channel means for exhausting said fluid from said first sleeve shaft; and means for causing said fluid to fill substantially the radial clearance between said first sleeve shaft and said cantilever shaft in the region of said radial play.

43. The machine according to claim 38, wherein said damper means comprises a ring mounted in said machine about said other end of said cantilever shaft and means for resiliently biasing said ring to allow limited radial deflection of said cantilever shaft during rotation.

44. The machine according to claim 43, wherein said ring comprises an inner bore adjacent the outer diameter of said cantilever shaft, said inner bore including means for inducing loss of contact between said cantilever shaft and said rotating impeller, and said inner bore, whereby said whirling is substantially eliminated.

45. The machine according to claim 38, wherein said damper means comprises an inner bushing spaced from said cantilever shaft; resilient means surrounding said bushing for absorbing energy imparted to said bushing by contact with said cantilever shaft; an outer mounting ring surrounding said resilient means; and means for resiliently biasing said mounting ring to permit limited radial deflection thereof.

46. The machine according to claim 45, wherein said means for absorbing comprises a layer of resilient material between said bushing and said mounting ring.

47. The machine according to claim 38, wherein said damper means comprises a ring surrounding said cantilever shaft and means for resiliently biasing said ring into contact with said other end of said cantilever shaft to limit radial deflection thereof during rotation.

48. The machine according to claim 47, wherein said cantilever shaft comprises a conical portion and a radially extending horizontal portion at said other end, and said ring comprises a conical face on its inner diameter and a horizontal face, said conical portion and said conical face and said horizontal portion and said horizontal face being biased into contact.

49. The machine according to claim 46, wherein said damper means further comprises a ring surrounding said cantilever shaft and means for resiliently biasing said ring into contact with said other end of said cantilever shaft to limit radial deflection thereof during rotation.

50. The machine according to claim 41, wherein said means for inducing loss of contact comprises a varying radius in said inner bore, whereby said loss of contact is induced as said shaft moves from contact with a portion of said bore having one radius to a portion of said bore having one radius to a portion having a larger radius.

51. In a centrifugal crushing machine of the type in which an inpeller is mounted for rotation within the machine and adapted to project particles of material toward at least one target surface, the improvement comprising:

a first sleeve shaft mounted for rotation within said machine;

a central cantilever shaft rigidly connected at one end of said cantilever shaft within said first sleeve shaft and having substantial radial play within said first sleeve shaft at the other end of said cantilever shaft, said cantilever shaft being connected to said impeller for rotation therewith;

damper means about the other end of said cantilever shaft for reducing radial vibration of said cantilever shaft as it rotates through critical speeds and for substantially eliminating whirling of said cantilever shaft and impeller.

52. The machine according to claim 51, wherein said at least one target surface is mounted for rotation independently of said impeller, further comprising:

a second sleeve shaft mounted for rotation within said machine, and around said first sleeve shaft, said second sleeve shaft being operatively connected to said at least one target for rotation therewith.

53. The machine according to claim 52, wherein said damper means comprises a ring mounted to said second sleeve shaft about said other end of said cantilever shaft, and means resiliently biasing said ring to allow limited radial deflection of said cantilever shafting during rotation.

54. The machine according to claim 53, wherein said ring comprises an inner bore adjacent the outer diameter of said cantilever shaft, said inner bore including means for inducing loss of contact between said cantilever shaft and said rotating impeller, and said inner bore, whereby said whirling is substantially eliminated.

55. The machine according to claim 51, including means for introducing flowing fluid into said first sleeve shaft, wherein said damper means comprises:

flow channel means for exhausting said fluid from said first sleeve shaft; and means for causing said fluid to fill substantially the radial clearance between said first sleeve shaft and said cantilever shaft in the region of said radial play.

56. The machine according to claim 51, wherein said damper means comprises a ring mounted in said machine about said other end of said cantilever shaft, and means resiliently biasing said ring to allow limited radial deflection of said cantilever shaft during rotation.

57. The machine according to claim 56, wherein said ring comprises an inner bore adjacent the outer diameter of said cantilever shaft, said inner bore including means for inducing loss of contact between said cantilever shaft and said rotating impeller, and said inner bore, whereby said whirling is substantially eliminated.

58. The machine according to claim 51, wherein said damper means comprises an inner bushing spaced from said cantilever shaft; resilient means surrounding said bushing for absorbing energy imparted to said bushing by contact with said cantilever shaft; an outer mounting ring surrounding said resilient means; and means for resiliently biasing said mounting ring to permit limited radial deflection thereof.

59. The machine according to claim 58, wherein said means for absorbing comprises a layer of resilient material between said bushing and said mounting ring.

60. The machine according to claim 51, wherein said damper means comprises a ring surrounding said cantilever shaft and means for resiliently biasing said ring into contact with said other end of said cantilever shaft to limit radial deflection thereof during rotation.

61. The machine according to claim 60, wherein said cantilever shaft comprises a conical portion and a radially extending horizontal portion at said other end, and said ring comprises a conical face on its inner diameter and a horizontal face, said conical portion and said conical face and said horizontal portion and said horizontal face being biased into contact.

62. The machine according to claim 59, wherein said damper means further comprises a ring surrounding said cantilever shaft and means for resiliently biasing said ring into contact with said other end of said cantilever shaft to limit radial deflection thereof during rotation.

63. The machine according to claim 57, wherein said means for inducing loss of contact comprises a varying radius in said inner bore, whereby said loss of contact is induced as said shaft moves from contact with a portion of said bore having one radius to a portion of said bore having one radius to a portion having a larger radius.

* * * * *